3,674,334
CATOPTRIC ANASTIGMATIC AFOCAL OPTICAL SYSTEM

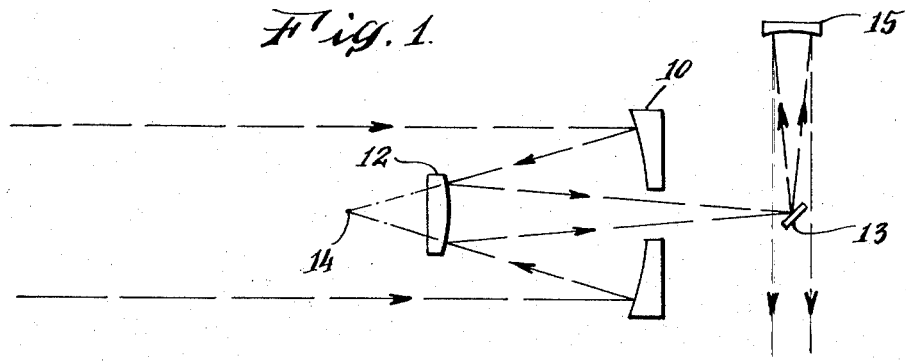
Fig. 1.
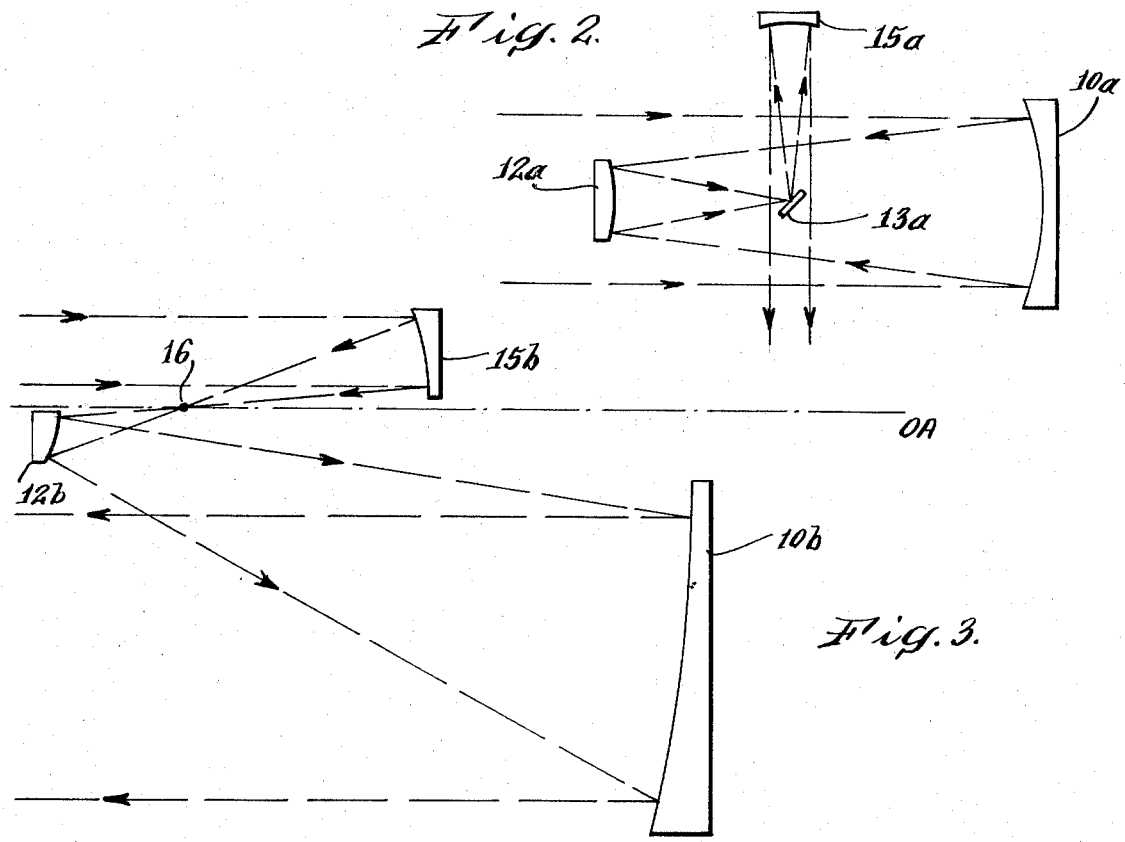
Fig. 2.
Fig. 3.
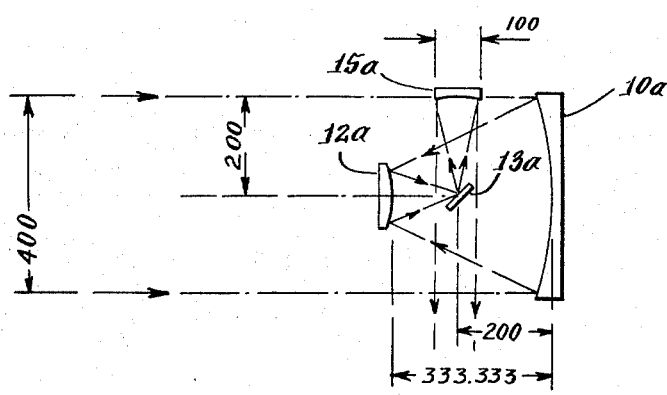
Fig. 4.
INVENTOR.
Abe Offner
BY John K. Conant
ATTORNEY.

Abe Offner, Darien, Conn., assignor to The Perkin-Elmer Corporation, Norwalk, Conn.
Filed Jan. 4, 1971, Ser. No. 103,495
Int. Cl. G02b 17/06, 23/02
U.S. Cl. 350—55
6 Claims

ABSTRACT OF THE DISCLOSURE

A catoptric anastigmatic afocal optical system is formed by two concave paraboloidal reflectors of different powers and a convex hyperboloidal reflector each adapted to receive and focus radiant energy. A paraboloidal reflector and the hyperboloidal reflector have their axes optically coincident and are positioned with the real focus of this paraboloidal reflector at the virtual focus of the hyperboloidal reflector. The axis of the other paraboloidal reflector is optically coincident with the axis of the hyperboloidal reflector and its real focus is coincident with the real focus of the combination of the first paraboloidal reflector and the hyperboloidal reflector. By having the sum of the powers of all the reflectors equal zero; all third order aberrations except distortion are zero; if the sum is not zero, third order aberrations, other than field curvature and distortion, are zero.

---

The present invention relates to afocal optical systems and particularly to a catoptric anastigmatic afocal telescopic optical system, which provides high magnification in a relatively short length as compared with previously known systems, and with which all third order aberrations except distortion may be reduced to zero.

In accordance with this invention a three mirror system is formed by a Cassegrain system, which consists of a first concave paraboloidal mirror and a convex hyperboloidal mirror, arranged confocally with a second concave paraboloidal mirror. Each of the three mirrors is adapted to receive and focus radiant enegy. The first paraboloidal mirror and the hyperboloidal mirror are positioned with their axes optically coincident and are spaced so that the real focus of the first paraboloidal mirror is at the virtual focus of the hyperboloidal mirror. The second paraboloidal mirror is positioned with its axis optically coincident with the axis of the hyperboloidal mirror and its real focus coincident with the real focus of the combination of the paraboloidal and hyperboloidal mirrors. With this arrangement, if the sum of the powers of the three mirrors is zero, all third order aberrations except distortion are zero. If the sum is not zero, the Petzval sum of the system is equl to the sum of the powers of the mirrors with reversed sign and all third order aberrations, except field curvature and distortion are zero.

There are two particularly important advantages of this system over prior art systems consisting of two confocal paraboloidal mirrors or reflectors. The first is that in this system, the sum of the powers of the mirrors can be made equal to zero. When this is done, incident waves whose normals make an angle other than zero with the optical axis are converted into plane waves, that is, the system is afocal for directions other than the axial direction. The system consisting of two confocal paraboloids is afocal only in the axial direction. Plane incident waves whose normals are at an angle, $\theta$, with the optical axis are converted into spherical waves with curvature equal to the sum of the powers of the paraboloidal mirrors multiplied by the factor $(m\theta)^2/2$, where $m$ is the telescopic magnification of the afocal system.

A second important advantage is that for telescopic magnification different from unity, the system of this invention can be made appreciably shorter than previously known confocal parabola systems. This is illustrated in the example, subsequently described in detail, wherein a Cassegrain $f/2$ system constructed in accordance with this invention to have an aperture of 400 has an overall length of 333.333. In contradistinction an $f/2$ parabola system of previously known design having an aperture of 400 would require an overall length of 800.

Further objects, advantages and features of the optical system of this invention will be apparent from the following detailed description of illustrative embodiments shown in the accompanying drawings in which:

FIGS. 1, 2 and 3 are schematic illustrations of three varied forms of the system of this invention, and FIG. 4 is a schematic illustration of a specific embodiment of a system of the form shown in FIG. 2.

Referring to FIG. 1 a first concave paraboloidal mirror 10 having a central aperture 11 therethrough is positioned to receive substantially collimated radiant energy from a distant object and reflect it to a convex hyperboloidal mirror 12 positioned to reflect the energy received and focus this energy through the aperture 11 to a plane mirror 13 that is behind the mirror 10.

As shown, the plane mirror 13 is at the real focus of the hyperboloidal mirror 12, whose virtual focus is indicated at 14. The paraboloidal mirror 10 and hyperboloidal mirror 12 are arranged with their axes optically coincident and are spaced so that the real focus of the paraboloidal mirror 10 is at the virtual focus 14 of the hyperboloidal mirror 12. Thus a plane wave front normal to the axis of the paraboloidal mirror 10 and incident on it is converted into a spherical wave with its center at the focus of paraboloidal mirror 10 which is coincident with the virtual focus 14 of the hyperboloidal mirror 12. The hyperboloidal mirror 12 then reshapes the spherical wave to a spherical wave having its center at the real focus (i.e., at plane mirror 13) of the combination of the paraboloid and the hyperboloid.

The plane mirror 13 is tilted (e.g., at 90 degrees) to bend the energy received from the hyperboloidal mirror 12 to a second paraboloidal mirror 15, which may have a different power from the first paraboloidal mirror 10 and which reflects a collimated beam of energy of a different diameter (smaller, as shown) than the beam entering the system.

The mirror 13 makes the axis of the second paraboloidal mirror 15 coincident with the axis of the hyperboloidal mirror 12; thus the focus of the second paraboloidal mirror 15 is concident with the real focus (i.e., at plane mirror 13) of the combination of the first paraboloid and the hyperboloid. A spherical wave with its center at the real focus of the combination of the paraboloidal mirror 10 and the hyperboloidal mirror 12 is therefore converted by the second paraboloidal mirror 15 to a plane wave normal to the axis of the latter mirror.

FIG. 2 shows a variation in which the powers of the mirrors are selected so that a convex hyperboloidal mirror 12a is spaced in front of a concave paraboloidal mirror 10a a distance less than the focal length of the mirror 10a, with a plane mirror 13a at the real focus of the combination of mirror 10a and mirror 12a to reflect the energy received therefrom to a second paraboloidal mirror 15a, the axis of which is at an angle to the axis of mirror 12a. As in the FIG. 1 embodiment, the mirror 13a serves to make the axis of mirror 15a optically coincident with the axis of the mirror 12a.

In the FIGS. 1 and 2 embodiments the arrangement of the hyperboloidal mirrors 12 and 12a, respectively, obscure some of the collimated light conducted through the system, either obscuring energy entering the system in the direction indicated in FIGS. 1 and 2 or leaving the system if the energy is passed through the system in the opposite direction.

FIG. 3 illustrates a variation in which obscuration is reduced to zero by arranging the mirrors off axis and by making the mirrors sections only of full mirrors. In this variation the plane mirror is eliminated and the substantially collimated energy from a distant object is shown entering from the small aperture direction. Energy entering this system is reflected by a section 15b of a concave paraboloidal mirror to a section 12b of a convex hyperboloidal mirror which is spaced from the mirror section 15b so that real focus of the combination of the mirror section 12b and concave paraboloidal mirror section 10b is at 16 which is also the real focus of mirror 15b. Energy is reflected by the mirror 12b to the concave paraboloidal mirror section 10b whose focus is at the virtual focus of mirror 12b and which in turn reflects a collimated beam of the energy out of the system. As shown, the mirror sections 10b and 12b are arranged on one side of (below) the optical axis OA while the mirror section 15b is on the opposite side of (above) the optical axis.

FIG. 4 shows a specific example of a system in accordance with this invention, which is an embodiment of the form of the system shown in, and described with reference to, FIG. 2. This is a 4× system with an intermediate image at $f/2$. The particulars are as follows:

| Mirror | Type | Distance to real focus | Distance to virtual focus |
|---|---|---|---|
| 10a | Paraboloid | 400 | |
| 12a | Hyperboloid | 133.333 | 66.667 |
| 13a | Plane (flat) | | |
| 15a | Paraboloid | 200 | |

| | Aperture diameter | Angular field diameter, deg. |
|---|---|---|
| Object space | 400 | 2.5 |
| Image space | 100 | 10 |

ABERRATIONS (IN RADIANS) IN IMAGE SPACE

| | 3rd order | 5th order |
|---|---|---|
| Spherical aberration | $-2.2 \times 10^{-8}$ | $2.0 \times 10^{-8}$ |
| Tangential coma | $2.6 \times 10^{-8}$ | $2.4 \times 10^{-8}$ |
| Astigmatic difference | $-5.5 \times 10^{-8}$ | $3.8 \times 10^{-5}$ |
| Petzval blur | 0 | $-7.4 \times 10^{-6}$ |
| Distortion | $-4.7 \times 10^{-4}$ | $2.7 \times 10^{-6}$ |
| Oblique spherical aberration: | | |
| Tangential | | $-6.1 \times 10^{-5}$ |
| Radial | | $4.5 \times 10^{-5}$ |
| Elliptic coma: | | |
| Tangential | | $8.8 \times 10^{-5}$ |
| Radial | | $2.9 \times 10^{-5}$ |

In this example, distortion is the only third order aberration which is greater than about .01 arc second $(4.85 \times 10^{-8} \text{ radian})$ This aberration does not affect the quality of the imagery of any direction in the field. It affects only the magnification associated with different directions.

The fifth order aberrations have been included to show that these also are quite small in this system in which the intermediate image is at $f/2$. Actual ray tracing through the system gives results that agree closely with the third and fifth order predictions of the aberrations.

It will be appreciated that certain modifications may be made in the structure and arrangement of the system of this invention as illustrated by the several illustrative variations described above without departing from the scope of the invention defined by the following claims.

What is claimed is:

1. A catoptric anastigmatic afocal optical system comprising: first and second concave paraboloidal reflectors and a convex hyperboloidal reflector adapted to receive and focus radiant energy, the first paraboloidal reflector and the hyperboloidal reflector being positioned with their axes optically coincident and being spaced so that the real focus of the first paraboloidal mirror is at the virtual focus of the hyperboloidal reflector, and the second paraboloidal reflector being positioned with its axis optically coincident with the axis of the hyperboloidal reflector and its real focus coincident with the real focus of the combination of the first paraboloidal reflector and the hyperboloidal reflector.

2. The system of claim 1 in which the sum of the powers of said three reflectors is zero.

3. The system of claim 1 in which the optical axes of the hyperboloidal reflector and of the second paraboloidal reflector are at an angle to each other and intersect, there being a plane reflector at said intersection making said axes coincident.

4. The system of claim 3 in which the first paraboloidal reflector has an aperture therethrough, the plane reflector and the second paraboloidal reflector being behind and the hyperboloidal reflector being in front of the first paraboloidal reflector, and the hyperboloidal reflector and the plane reflector being in optical alignment through said aperture.

5. The system of claim 3 in which the hyperboloidal, the plane and the second paraboloidal reflectors are in front of the first paraboloidal reflector, the plane reflector being between the hyperboloidal reflector and the first paraboloidal reflector.

6. The system of claim 1 in which the reflectors are paraboloidal sections and a hyperboloidal section, respectively, in which the section of the first paraboloidal reflector and the section of the hyperboloidal reflector are on one side of their coincident optical axes, and in which the section of the second paraboloidal reflector is on the opposite side thereof.

References Cited

UNITED STATES PATENTS

| 1,578,899 | 3/1926 | Lohmann | 350—55 |
| 3,062,101 | 11/1962 | McCarthy | 350—55 |
| 3,460,886 | 8/1969 | Rumsey | 350—55 X |

OTHER REFERENCES

Ingalls, Telescopics 171 Scientific American, pp. 47–48, July 1944.

Holleran, Gleanings for ATM's 27(4) Sky and Telescope, pp. 242–246, April 1964.

DAVID SCHONBERG, Primary Examiner

J. W. LEONARD, Assistant Examiner

U.S. Cl. X.R.

350—294